United States Patent
Tripathi et al.

(10) Patent No.: US 12,408,575 B2
(45) Date of Patent: Sep. 9, 2025

(54) AUTO-GUIDANCE CONTROL FOR AGRICULTURAL VEHICLES

(71) Applicant: CNH Industrial America LLC, New Holland, PA (US)

(72) Inventors: Abhinav Tripathi, New Holland, PA (US); Dhruv Ghiya, New Holland, PA (US); Phillip Dix, Westmont, IL (US); Aditya Singh, Bolingbrook, IL (US); Navneet Gulati, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 311 days.

(21) Appl. No.: 18/083,047

(22) Filed: Dec. 16, 2022

(65) Prior Publication Data

US 2024/0196778 A1    Jun. 20, 2024

(51) Int. Cl.
*A01B 69/00* (2006.01)
*A01M 7/00* (2006.01)

(52) U.S. Cl.
CPC ......... *A01B 69/004* (2013.01); *A01M 7/0089* (2013.01)

(58) Field of Classification Search
CPC .. A01B 69/004; A01B 69/008; A01M 7/0089; A01D 41/1278; G05B 19/0423; G05B 2219/25257
See application file for complete search history.

(56) References Cited

U.S. PATENT DOCUMENTS

| | | | |
|---|---|---|---|
| 10,173,236 B2 | 1/2019 | Preheim et al. |
| 10,499,561 B2 | 12/2019 | Grotelueschen et al. |
| 10,631,531 B2 | 4/2020 | Engelbrecht et al. |
| 10,721,859 B2 | 7/2020 | Wu et al. |
| 10,786,826 B2 | 9/2020 | Sullivan et al. |
| 11,051,505 B2 | 7/2021 | Humpal et al. |
| 11,168,707 B2 | 11/2021 | Grosse Prues et al. |
| 11,284,611 B2 | 3/2022 | Smith |

(Continued)

FOREIGN PATENT DOCUMENTS

| | | |
|---|---|---|
| JP | 2021-083400 A | 6/2021 |
| WO | WO-2022/172133 A1 | 8/2022 |

OTHER PUBLICATIONS

Cruvinel et al., "An advanced sensors-based platform for the development of agricultural sprayers," Sensors and Applications in Measuring and Automation Control Systems 4: 181-204, Dec. 2016.

(Continued)

*Primary Examiner* — Anne Marie Antonucci
*Assistant Examiner* — Luis G Del Valle
(74) *Attorney, Agent, or Firm* — Foley & Lardner LLP

(57) ABSTRACT

A system and a method for controlling an agricultural vehicle includes receiving sensor information for the agricultural vehicle from one or more sensors, determining a change in a state of the agricultural vehicle based on the sensor information, determining a change in a physical parameter of the agricultural vehicle based on the change in the state of the agricultural vehicle, updating an auto-guidance controller for the agricultural vehicle based on the change in the physical parameter of the agricultural vehicle, and controlling an operation of the agricultural vehicle based on the updated auto-guidance controller.

16 Claims, 6 Drawing Sheets

(56) References Cited

U.S. PATENT DOCUMENTS

| | | | |
|---|---|---|---|
| 2011/0084851 A1* | 4/2011 | Peterson | A01M 7/0089 340/902 |
| 2015/0102569 A1* | 4/2015 | Slawson | A01B 76/00 280/5.514 |
| 2015/0105965 A1* | 4/2015 | Blackwell | B62D 63/025 701/28 |
| 2024/0176352 A1* | 5/2024 | Krog | B60K 17/043 |

OTHER PUBLICATIONS

Gonzalez et al., "Design and implementation of an automatic pressure-control system for a mobile sprayer for greenhouse applications," Spanish Journal of Agricultural Research 10, No. 4: 939-949, Nov. 2, 2012.

Terra et al., "Autonomous agricultural sprayer using machine vision and nozzle control," Journal of Intelligent & Robotic Systems 102, No. 2: 1-18, Mar. 2021.

* cited by examiner

AUTO-GUIDANCE CONTROL FOR AGRICULTURAL VEHICLES

BACKGROUND

The present disclosure relates generally to vehicle controls for industrial vehicles such as agricultural vehicles or construction vehicles. More specifically, the present disclosure relates to dynamically updating the guidance controls for a vehicle based on changes to the vehicle.

SUMMARY

One embodiment relates to a method. The method includes: receiving sensor information for the agricultural vehicle from one or more sensors, determining a change in a state of the agricultural vehicle based on the sensor information, determining a change in a physical parameter of the agricultural vehicle based on the change in the state of the agricultural vehicle, updating an auto-guidance controller for the agricultural vehicle based on the change in the physical parameter of the agricultural vehicle, and controlling an operation of the agricultural vehicle based on the updated auto-guidance controller.

In one embodiment, the physical parameter is at least one of a mass of the agricultural vehicle, a moment of inertia of the agricultural vehicle, and a location of the center of gravity on the agricultural vehicle. In one embodiment, wherein the agricultural vehicle includes a sprayer tank and is coupled to a sprayer implement. In one embodiment, the state of the agricultural vehicle includes an amount of fluid within the sprayer tank and an operation mode for the sprayer implement.

In one embodiment, the one or more sensors includes at least one of volume sensor, a motion sensor, and a hydraulics sensor. In one embodiment the agricultural vehicle includes a product storage tank and is coupled to a combine implement which is configured harvest product and store the product in the product storage tank. In one embodiment, the state of the agricultural vehicle includes an amount of product within the product storage tank and an operation mode for the combine implement. In one embodiment, controlling the operation of agricultural vehicle includes at least one of controlling a steering of the agricultural vehicle, controlling a speed of the agricultural vehicle, and controlling a braking mechanism of the agricultural vehicle. In one embodiment, the method further comprises controlling an operation of an implement coupled to the agricultural vehicle based on the updated auto-guidance controller.

Another embodiment of the present disclosure is a non-transitory computer readable media comprising computer-readable instructions stored thereon that when executed by a processor causes the processor to receive sensor information for the agricultural vehicle from one or more sensors, determine a change in a state of the agricultural vehicle based on the sensor information, determine a change in a physical parameter of the agricultural vehicle based on the change in the state of the agricultural vehicle, update an auto-guidance controller for the agricultural vehicle based on the change in the physical parameter of the agricultural vehicle, and control an operation of the agricultural vehicle based on the updated auto-guidance controller.

In one embodiment, the physical parameter is at least one of a mass of the agricultural vehicle, a moment of inertia of the agricultural vehicle, and a location of the center of gravity on the agricultural vehicle. In one embodiment, wherein the agricultural vehicle includes a sprayer tank and is coupled to a sprayer implement. In one embodiment, the state of the agricultural vehicle includes an amount of fluid within the sprayer tank and an operation mode for the sprayer implement.

In one embodiment, the one or more sensors includes at least one of volume sensor, a motion sensor, and a hydraulics sensor. In one embodiment the agricultural vehicle includes a product storage tank and is coupled to a combine implement which is configured harvest product and store the product in the product storage tank. In one embodiment, the state of the agricultural vehicle includes an amount of product within the product storage tank and an operation mode for the combine implement. In one embodiment, controlling the operation of agricultural vehicle includes at least one of controlling a steering of the agricultural vehicle, controlling a speed of the agricultural vehicle, and controlling a braking mechanism of the agricultural vehicle. In one embodiment, the method further comprises controlling an operation of an implement coupled to the agricultural vehicle based on the updated auto-guidance controller.

Still another embodiment relates to an auto-guidance vehicle control system. The auto-guidance vehicle control system includes an agricultural vehicle, an implement coupled to the agricultural vehicle, and a vehicle control system. The vehicle control system includes one or more processing circuits, each processing circuit including a processor and a memory, the memory having instructions stored thereon that, when executed by the processor, cause the processing circuit to receive sensor information for the agricultural vehicle from one or more sensors, determine a change in a state of the agricultural vehicle based on the sensor information, determine a change in a physical parameter of the agricultural vehicle based on the change in the state of the agricultural vehicle, update an auto-guidance controller for the agricultural vehicle based on the change in the physical parameter of the agricultural vehicle, and control an operation of the agricultural vehicle based on the updated auto-guidance controller.

In one embodiments, the implement is at least one of a sprayer implement and a combine implement.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
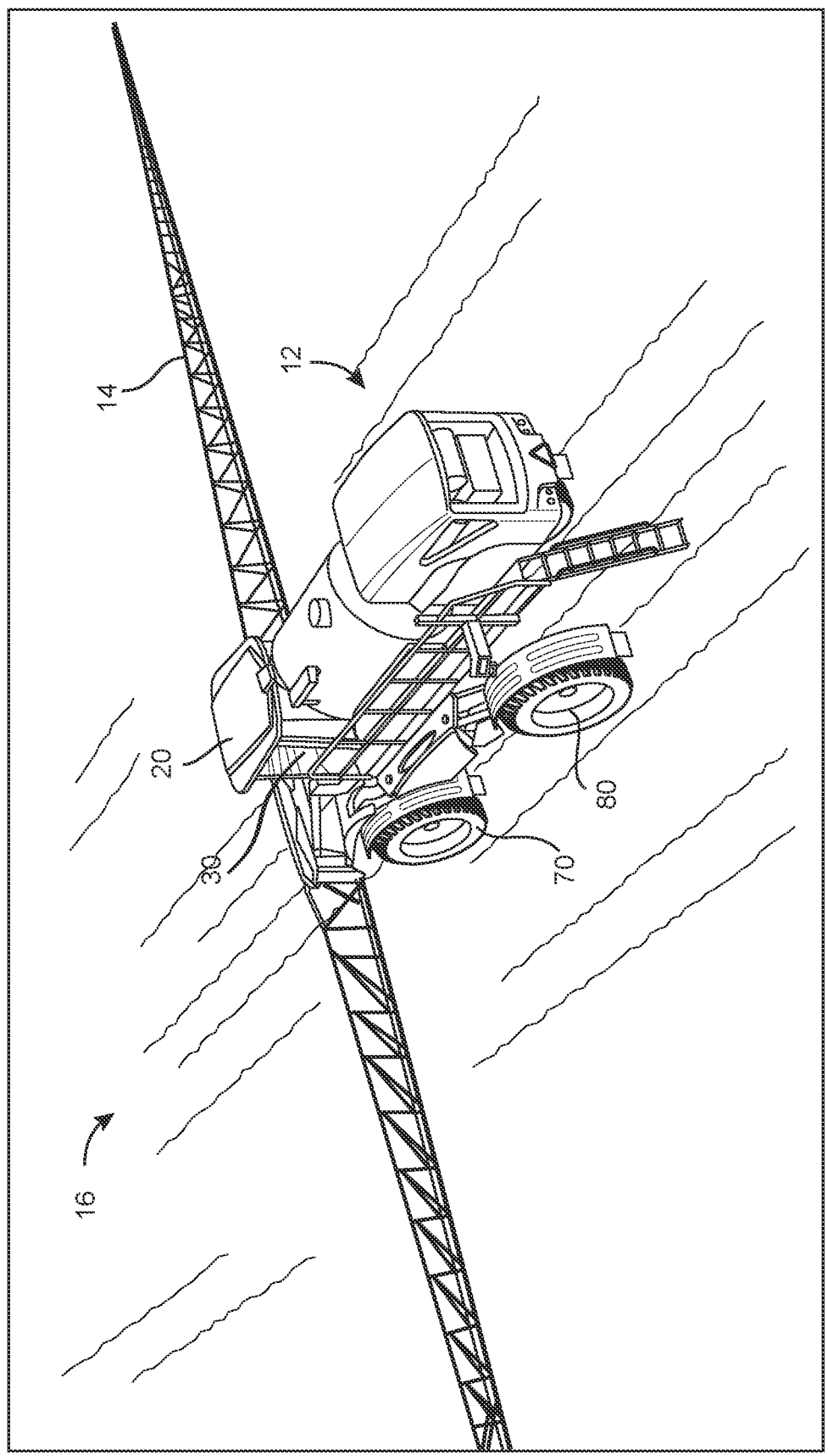
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Industrial vehicles such as agricultural vehicles (e.g., tractors, tillers, planters, sprayers, combines, and fertilizers, etc.) may be utilized in agricultural applications to facilitate the growing of crops and any other type of agricultural application. Typically, agricultural vehicles may include one or more vehicle control systems which are configured to control the operation of the vehicle to provide auto-guidance for the vehicle. An auto-guidance control system may be described as an automated method for controlling one or more vehicles with a high level of accuracy. The auto-guidance control system may allow the vehicle to steer, turn, and generally operate a vehicle with at least some level of autonomy with a high level of positioning accuracy. Agricultural vehicles may have several different machine-states and/or operating modes based on the agricultural application being implemented by the agricultural vehicle. For example, the machine state may vary based on the product (e.g., fertilizer, pesticide, etc.) in a sprayer tank associated with the vehicle or the amount of crop in a storage tank associate with the vehicle. Additionally, the operation mode may vary based on the agricultural implement (e.g., sprayer, combine, tiler, etc.) coupled to the agricultural vehicle and the state of the agricultural implement (e.g., open, closed, active, partially open, partially active, etc.). In some embodiments, an agricultural vehicle may include an auto-guidance controller which may be configured to facilitate autonomous guidance within the agricultural vehicles. Changes in machine states and/or operation mode affects the critical machine parameters such as mass, moment of inertia, location of center of gravity, etc., of the agricultural vehicle which in turn changes the dynamic characteristics and handling of the vehicle. Such changes subsequently affect the performance of the auto-guidance controller. Typically, agricultural vehicles may include an auto-guidance controller which is responsible for controlling the operation of the vehicle during all the various permutations of different machine states and/or operating modes. Specifically, typical auto-guidance controllers may use a universal set of controller gains and algorithms to provide performance over a wide variety of operating conditions. The primary problem with typical auto-guidance controllers is creating, calibrating, and tuning the auto-guidance controller to be robust to all possible permutations of changes in the machine state and/or operating mode of the vehicle is a time consuming and resource intensive process and provides sub-optimal auto-guidance performance. Therefore, systems and methods for incorporating the information about the current machine state and operating mode, and the resulting influence on vehicle parameters, directly into the auto-guidance controller may be desired.

Systems and methods directed towards the control of industrial vehicles are described in the present application. More specifically, an auto-guidance system for controlling industrial vehicles is described. In the auto-guidance vehicle control system, information about the machine state and/or operating mode is sent to an auto-guidance controller which uses the information to dynamically adjust itself in real time to optimize the performance of the vehicle for the current machine state and operating mode. For example, in the auto-guidance system disclosed herein may include a variety of sensors and an auto-guidance controller which is configured to receive information from the variety of sensors. The auto-guidance controller may be configured to dynamically adjust in real-time by sensing the current machine state and operating mode of the vehicle. Since the auto-guidance controller is being adjusted for the specific current situation, the robustness constraint may be relaxed which may lead to better performance with the auto-guidance controller. The auto-guidance performance is now optimized based on the specific operating condition instead of over the all the possible operating conditions for the vehicle. For example, if the vehicle is a tractor coupled to a sprayer implement, the auto-guidance controller would receive the information that the booms associated with the sprayer have been opened either completely or partially. Additionally, the auto-guidance controller may receive information that the current the product volume in a sprayer tank has is 40%. The auto-guidance controller may then use that information to adjust itself accordingly.

For the purposes of the present disclosure, the term "vehicle" refers to any equipment that can be moved (e.g., within a field), regardless of whether the equipment includes a prime mover or other device configured to move the equipment under its own power. For example, the term "vehicle" applies to powered equipment such as a tractor, combine, harvester, etc., but the term "vehicle" also applies to equipment that moves through the assistance of another vehicle, such as various agricultural or construction implements that are attached/coupled to another vehicle (e.g., implements such as irrigation machinery, soil cultivation implements, planting equipment, harvesting implements, etc. that are attached to and moved by a tractor or other vehicle). Though agricultural vehicles are primarily described in the present disclosure, the systems and methods herein may be applied in a variety of industrial applications including construction.

Figure 3:
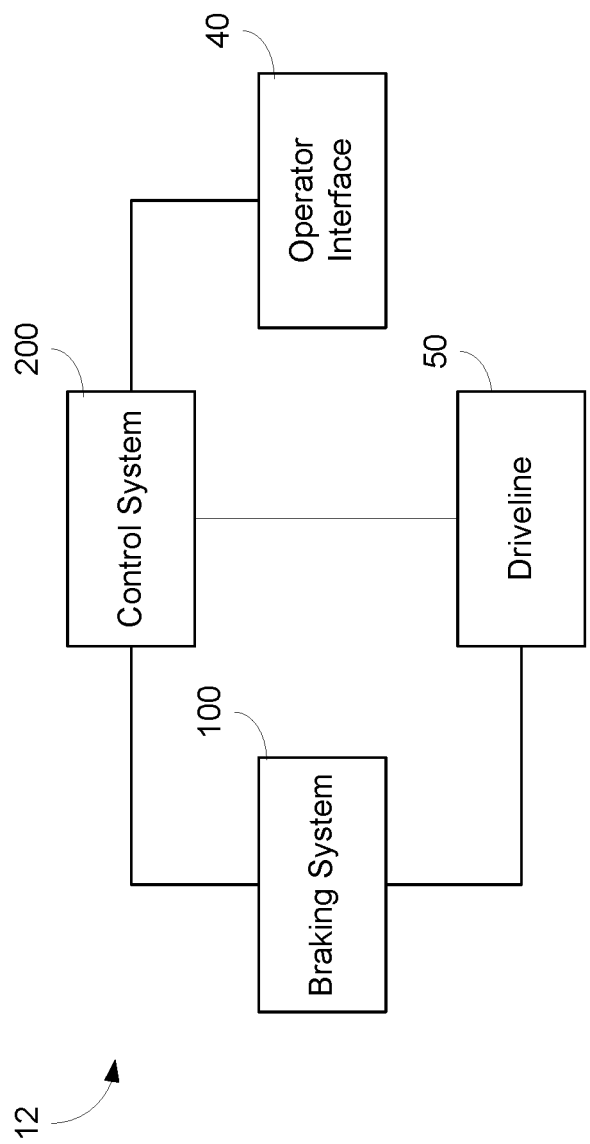
FIG. 3 is a schematic block diagram of the vehicle of FIG. 1, according to an exemplary embodiment

According to the exemplary embodiment shown in FIG. 1, a machine or vehicle, shown as vehicle 12, a body assembly, shown as body 20, coupled to a vehicle frame and having an occupant portion or section, shown as cab 30. The cab 30 may include one or more operator input and output devices that are disposed within the cab 30. The operator input and output devices may include a steering wheel, a gear shift, and/or a display screen. The vehicle 12 may be propelled by a drivetrain 50, which is described in more detail with respect to FIG. 4. In some embodiments, as shown in FIG. 3, the vehicle 12 may also include a vehicle braking system 100, coupled to one or more components of the driveline 50 to facilitate selectively braking the one or more components of the driveline 50. The vehicle 12 also includes a vehicle control system, shown as control system 200, coupled to the operator interface 40, the driveline 50, and the braking system 100. In other embodiments, the vehicle 12 includes more or fewer components. In the exemplary embodiment shown in FIG. 1, the vehicle 12 is an agricultural vehicle with a sprayer implement 14 that is structured to distribute a product within an agricultural area 16. In some embodiments, the vehicle 12 may include a sprayer boom (not pictured) which is configured to apply the product.

Figure 2:
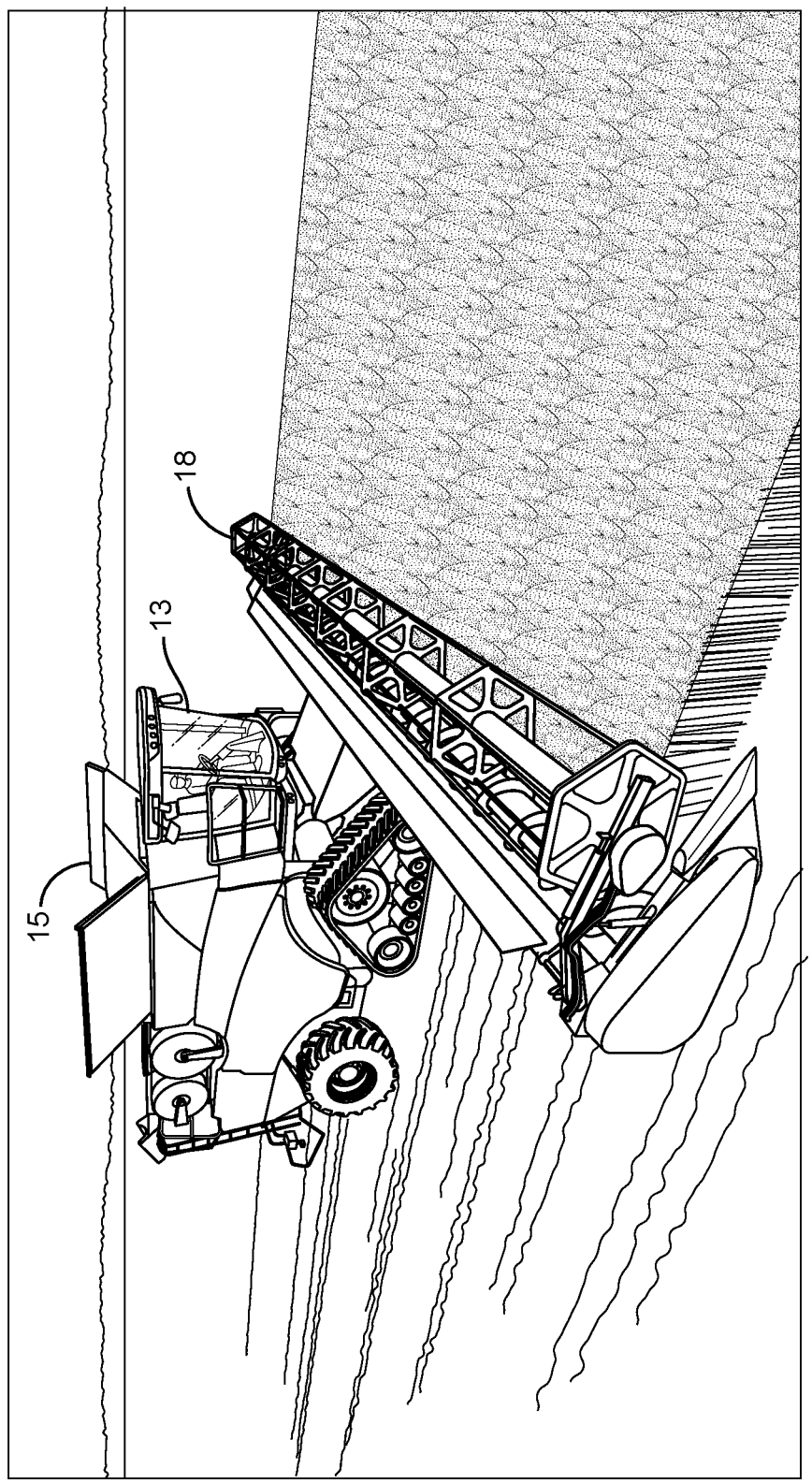
FIG. 2 is a perspective view of another vehicle, according to an exemplary embodiment.

According to the exemplary embodiment shown in FIG. 2, another machine or vehicle, shown as vehicle 13 is shown. In some embodiments, the vehicle 13 may include some or all of the elements of the vehicle 12 as described herein. In some embodiments, the vehicle 13 may be configured to harvest a crop. The vehicle 13 may include a combine 18 and a storage tank 15. Specifically, the vehicle 13 may be electrically and mechanically coupled to the combine 18 which is configured to detach a crop from a field to harvest the crop. The harvested crop may be configured to travel through the combine 18, up through the vehicle 13, till the harvested crop reaches the storage tank 15 where the harvested crop is stored.

It should be understood that the vehicle 12 shown in FIG. 1 and the vehicle 13 shown in FIG. 2 are merely examples, and the features of the present disclosure can be used with any type of vehicle (e.g., any type of industrial vehicle, such as an agricultural or construction vehicle) in various example embodiments. According to an exemplary embodiment, the vehicle 12 and vehicle 13 are an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 12 and/or the vehicle 13 may include one or more attached implements and/or trailed implements such as a combine, a sprayer, a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 12. In some embodiments, the cab 30 is configured to provide seating for one or more passengers of the vehicle 12. According to an exemplary embodiment, the operator interface 40 is configured to provide an operator with the ability to control one or more functions of and/or provide commands to the vehicle 12 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

Figure 4:
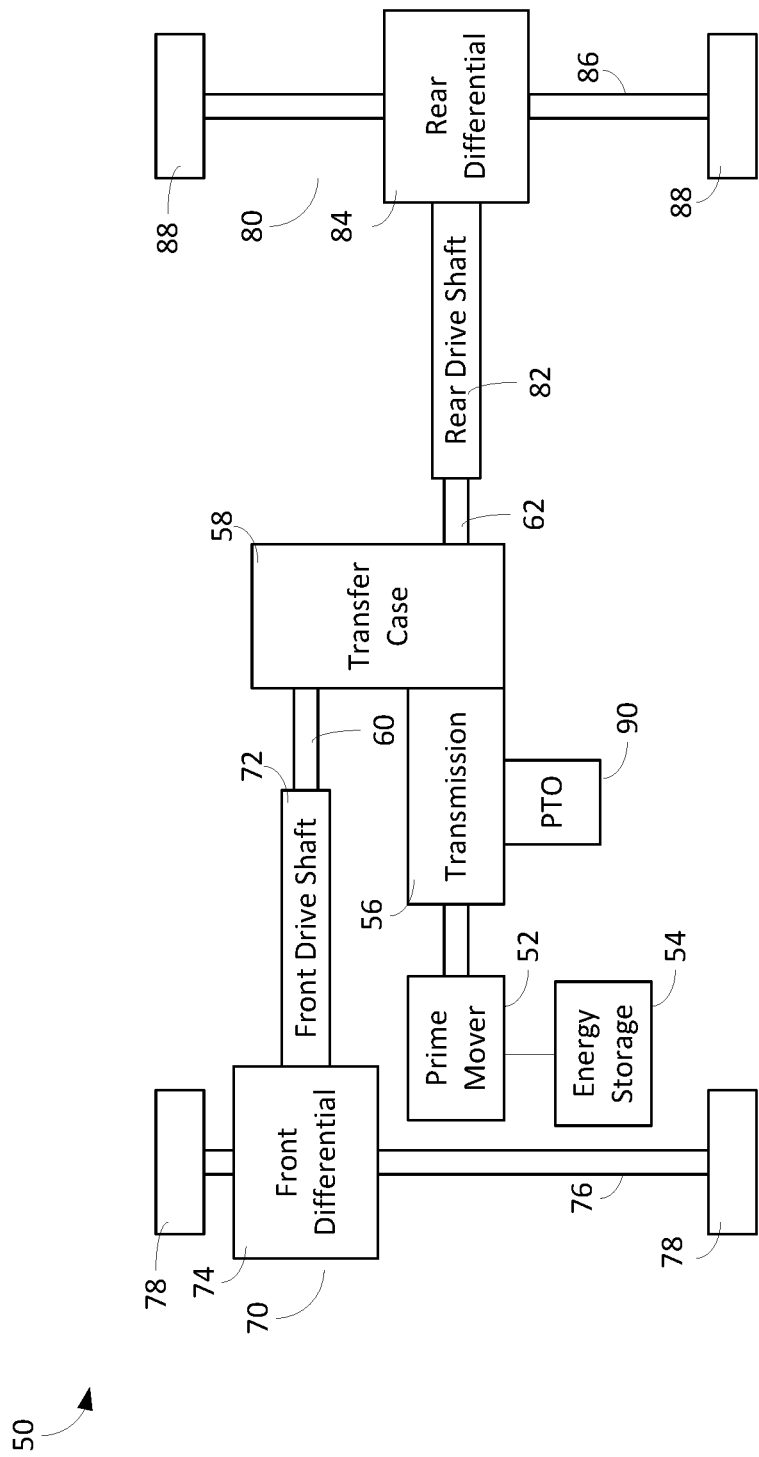
FIG. 4 is a schematic block diagram of the vehicle of FIG. 1, according to an exemplary embodiment.

According to an exemplary embodiment, the driveline 50 is configured to propel the vehicle 12. As shown in FIG. 4, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 4, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIG. 4, a front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIG. 4, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. According to the exemplary embodiment shown in FIG. 2, the front tractive elements 78 are structured as tracks while the rear tractive elements 88 are structured as wheels. In other embodiments, the front tractive elements 78 and the rear tractive elements 88 are otherwise structured. In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 12. The trailer brakes are positioned to facilitate selectively braking one or more axles and/or one more tractive elements (e.g., wheels, etc.) of the trailed implement.

Figure 5:
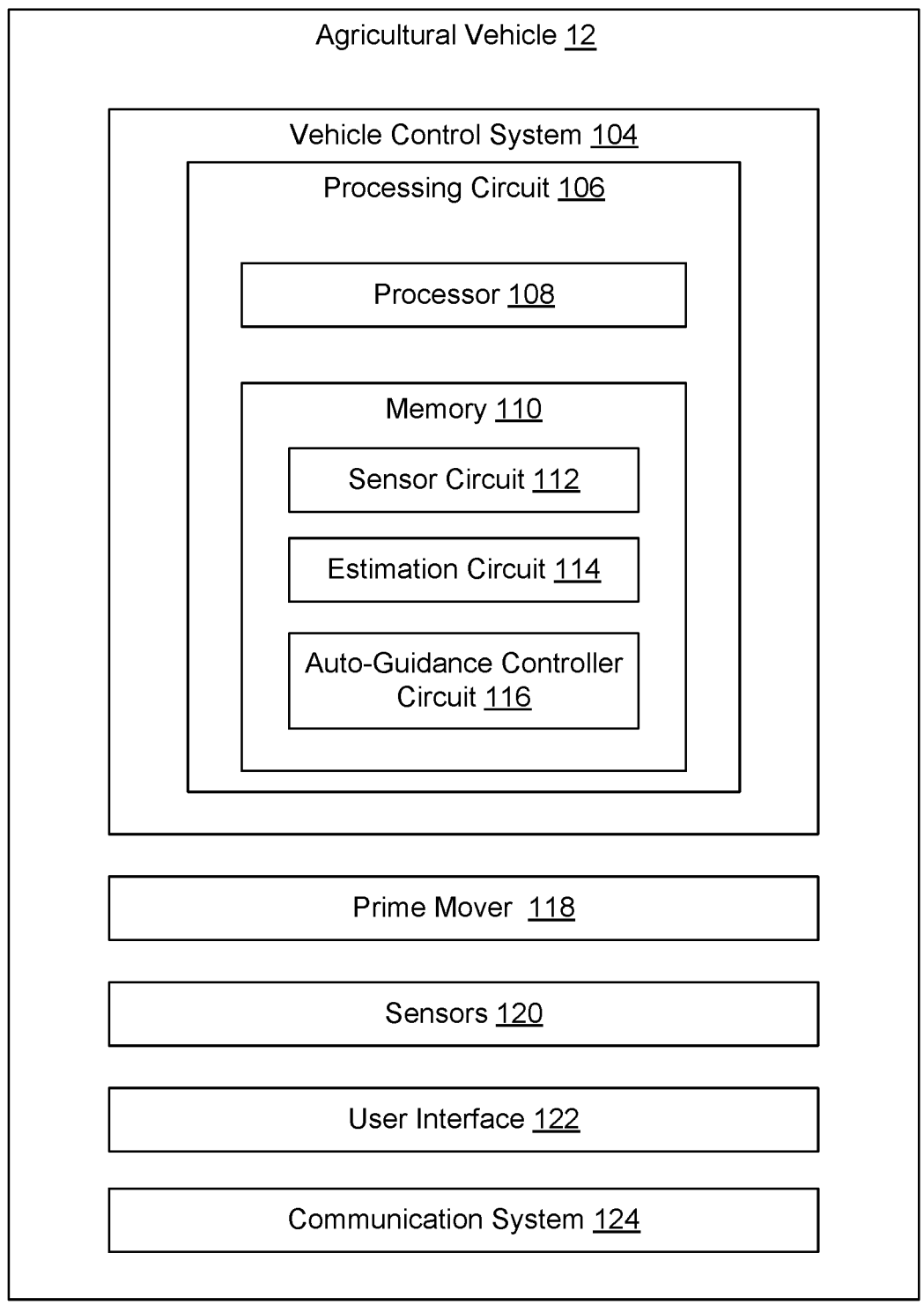
FIG. 5 is a schematic block diagram of a vehicle control system for controlling the vehicle of FIG. 1 and the vehicle of FIG. 2, according to an exemplary embodiment.

Referring now to FIG. 5, a schematic diagram of an agricultural vehicle 12 with a vehicle control system 104 is shown according to an exemplary embodiment. The agricultural vehicle 12 may be similar to either vehicle 12 or vehicle 13 which are described in more detail above. The agricultural vehicle 12 includes vehicle control system 104, sensor(s) 120, user interface 122, and communication system 124. Vehicle control system 104 may control operation of the agricultural vehicle to implement an auto-guidance vehicle control scheme. In various embodiments, the vehicle control system 104 is physically located with the agricultural vehicle 12. For example, the vehicle control system 104 may be or include a hardware component installed in or on the agricultural vehicle 12. Additionally or alternatively, part or all of the vehicle control system 104 may be located separately from the agricultural vehicle 12. For example, in some implementations, portions of the vehicle control system 104 may be implemented within a remote processing system (e.g., a server, two or more computing systems/servers in a distributed computing implementation, a cloud-based processing system, etc.) configured to receive input from a remote data source and generate data and/or control first the agricultural vehicle 12 remotely.

The sensor(s) 120 may monitor one or more parameters associated with the agricultural vehicle 12. For example, the sensor(s) 120 may monitor operation of the prime mover 52 (e.g., torque, temperature, fuel level, airflow, etc.). Additionally or alternatively, sensor(s) 120 may monitor an environment of the agricultural vehicle 12. Additionally, the sensor(s) 120 may monitor the status of one or more implements attached to the agricultural vehicle. For example, the sensor(s) 120 may include a motion sensor which may be used to determine whether parts or the entire implement is in use. As another example, a fluid flow sensor may be used within a sprayer implement to determine the amount of fluid being sprayed through the sprayer. Information received from the sensor(s) 120 may be used, either alone or in combination, to determine an operation mode and machine state of the agricultural vehicle. The sensor(s) 120 may include engine sensors, transmission sensors, chassis sensors, safety sensors, driver assistance sensors, passenger comfort sensors, entertainment systems sensors, and/or the like. In some embodiments, the sensor(s) 120 may receive input from external sources. For example, the sensor(s) 120 may include position sensors configured to communicate with one or more beacons located throughout a farm field to determine a location of the agricultural vehicle 12. In various embodiments, the sensor(s) 120 are physically located on or in the agricultural vehicle 12. For example, the sensor(s) 120 may include a chassis mounted infra-red sensor configured to measure crop health. Additionally or alternatively, sensor(s) 120 may be located separately of the agricultural vehicle 12. In some embodiments, the sensor(s) 120 may include hardware and/or software components. For example, the sensor(s) 120 may include a GPS receiver configured to receive positional data and a software component configured to determine positional parameters associated with the agricultural vehicle 12 (e.g., pose, speed, yaw, trajectory, etc.) based on the positional data. As another example, sensor(s) 120 may include an optical device (e.g., a camera, LIDAR sensor, etc.) configured to capture image data.

The user interface 122 may facilitate user interaction with the agricultural vehicle 12. The user interface 122 may include elements configured to present information to a user and receive user input. For example, the user interface 122 may include a display device (e.g., a graphical display, a touchscreen, etc.), an audio device (e.g., a speaker, etc.), manual controls (e.g., manual steering control, manual transmission control, manual braking control, etc.), and/or the like. The user interface 122 may include hardware and/or software components. For example, the user interface 122 may include a microphone configured to receive user voice input and a software component configured to control the agricultural vehicle 12 based on the received user voice input. In various embodiments, the user interface 122 presents information associated with the operation of the agricultural vehicle 12 to a user and facilitates user control of operating parameters. For example, the user interface 122 may display operational parameters (e.g., fuel level, seed level, penetration depth of ground engaging tools, guidance swath, etc.) on a touchscreen display and receive user control input via the touchscreen display.

The communication system 124 may facilitate communication between the agricultural vehicle 12 and/or vehicle control system 104 and external systems (e.g., a remote database, etc.). The communication system 124 may be or include wired or wireless communications interfaces (e.g., jacks, antennas, transmitters, receivers, transceivers, wire terminals, etc.) for conducting data communications with other external systems or devices. In various embodiments, communications via communication system 124 is direct (e.g., local wired or wireless communications). Additionally or alternatively, communications via the communication system 124 may utilize a network (e.g., a WAN, the Internet, a cellular network, a vehicle-to-vehicle network, etc.). For example, vehicle control system 104 may communicate with a decision support system (DSS) using a 4G and/or 5G connection (e.g., via a 4G or 5G access point/small cell base station, etc.). In some embodiments, communication system 124 facilitates vehicle-to-vehicle (V2V) and/or vehicle-to-everything (V2X) communication. For example, communication system 124 may facilitate communication between multiple agricultural vehicles using the IEEE 802.11p standard (e.g., a wireless access in vehicular environments (WAVE) vehicular communication system) and/or Wi-Fi.

In some embodiments, the vehicle control system 104 includes a processing circuit 106 having a processor 108 and a memory 110. In some embodiments, vehicle control system 104 includes one or more processing circuits 106 including one or more processors 108 and one or more memories 110. Each of the processors 108 can be a general purpose or specific purpose processor, an application specific integrated circuit (ASIC), one or more field programmable gate arrays (FPGAs), a group of processing components, or other suitable processing components. Each of the processors 108 is configured to execute computer code or instructions stored in the memory 110 or received from other computer readable media (e.g., CDROM, network storage, a remote server, etc.).

In some embodiments, the memory 110 may include one or more devices (e.g., memory units, memory devices, storage devices, or other computer-readable media) for storing data and/or computer code for completing and/or facilitating the various processes described in the present disclosure. The memory 110 may include random access memory (RAM), read-only memory (ROM), hard drive storage, temporary storage, non-volatile memory, flash memory, optical memory, or any other suitable memory for storing software objects and/or computer instructions. The memory 110 may include database components, object code components, script components, or any other type of information structure for supporting the various activities and information structures described in the present disclosure. The memory 110 may be communicably connected to the processor(s) 108 via the processing circuit 106 and may include computer code for executing (e.g., by processor 108) one or more of the processes described herein.

In some embodiments, the memory 110 is shown to include a sensor circuit 112, an estimation circuit 114, and an auto-guidance controller circuit 116. In some embodiments, the sensor circuit 112 is configured to receive sensor information about the agricultural vehicle 12 and determine a change in the operation mode and/or machine state of the agricultural vehicle. For example, the sensor circuit 112 may be coupled to a sensor associated with a sprayer tank which is configured to provide information about the amount of fluid in the sprayer tank.

In some embodiments, the estimation circuit 114 is configured to receive the vehicle information from the sensor circuit 112 and use that information to estimate changes in the physical parameters and dynamic characteristics of the vehicle. Specifically, the estimation circuit 114 is configured to determine changes in the operation mode and/or machine state of the vehicle. For example, the estimation circuit 114 may be configured to determine a change in the level of fluid in the sprayer and deduce from that a change in the operation mode and/or machine state of the vehicle. As another example, a motion sensor associated with an implement attached to the agricultural vehicle 12 may send information to the sensor circuit 112 about the position and/or motion characteristics of the implement. Based on this information, the estimation circuit 114 may determine a change in the machine state of the agricultural vehicle 12 (e.g., sprayer booms open, closed, active, partially open, partially active, etc.). Further, the estimation circuit 114 may be configured to determine one or more changes in the physical parameters of the agricultural vehicle 12 based on the change in the operation mode and/or machine state of the vehicle.

In some embodiments, the auto-guidance controller circuit 116 may be configured to dynamically adjust the vehicle control system 104 based on the determined change in the operation mode and/or machine state of the agricultural vehicle 12. The auto-guidance controller circuit 116 may facilitate autonomous guidance within the agricultural vehicles. Specifically, as the auto-guidance controller circuit determines changes in the operation mode and/or machine state of the vehicle, the auto-guidance controller circuit 116 generates one or more correction offsets based on these changes. In some embodiments, the correction offsets correct for changes in critical vehicle parameters (e.g., mass, moment of inertia, location of the center of gravity, etc.) which allows the auto-guidance controller circuit 116 to optimize the operation and performance of the agricultural vehicle 12 over a wide variety of operating conditions.

Figure 6:
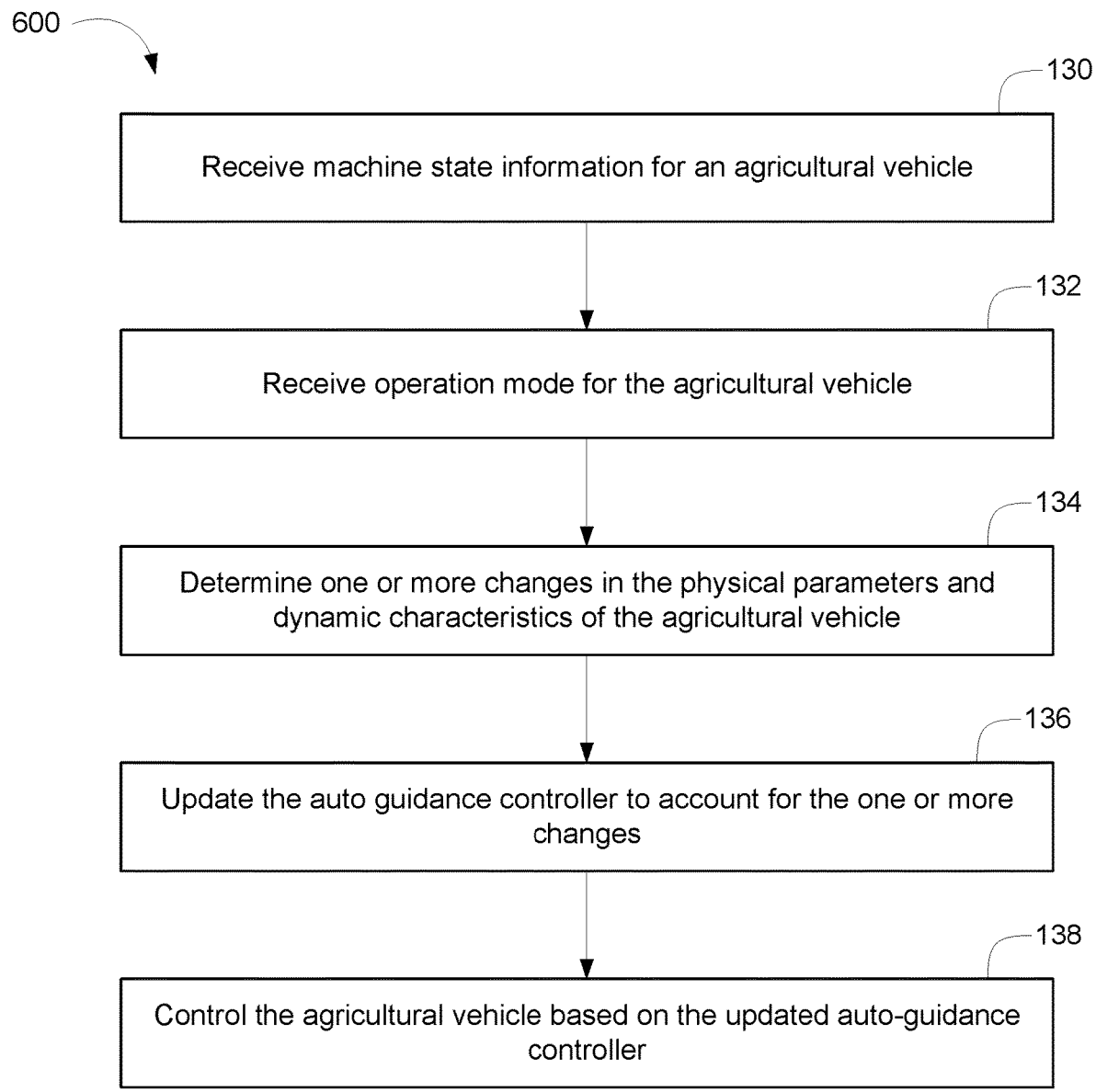
FIG. 6 is a flow diagram of a method for controlling the vehicles of FIG. 1 and FIG. 2, according to an exemplary embodiment.

Referring now to FIG. 6, a method 600 for controlling the operation of the vehicle 12 based on a vehicle control system utilizing an auto-guidance controller is shown, according to an exemplary embodiment. In some embodiments, the method 600 may be executed by the vehicle 12. More specifically, the method 500 may be executed by the vehicle control system 104.

At step 130, the vehicle control system 104 may receive sensor information for an agricultural vehicle, in some embodiments. As explained above, the vehicle control system 104 includes the sensor circuit 112 which is communicably coupled to one or more sensors 120 associated with the agricultural vehicle 12. The sensor circuit 112 may be structured to receive, aggregate, and store sensor information about the agricultural vehicle 12. In some embodiments, the sensor information may include data from a volume sensor, mass sensor, or level sensor which may be aggregated and converted to determine the amount of product (e.g., sprayer fluid, harvested crop, etc.). In some embodiments, the sensor information may include data from a hydraulics sensor assembly which will provide information about how the agricultural vehicle or the implement attached to the agricultural vehicle is being operated (e.g., implement in use/implement not in use/implement partially in use, etc.). For example, an agricultural vehicle may be attached to a sprayer implement. In such an case, the vehicle control system 104 may receive information from a hydraulic sensor which may allow the vehicle control system to determine whether the booms are completely open, partially open, open only on one side, or closed. In some embodiments, the sensor information may include data from a force torque sensor which when attached to a hitch for the agricultural vehicle 12 may measure the force/torque interaction between the tractor and the implement. In some embodiments, the sensor information may be filtered to remove noise before being further used in the vehicle control system 104. Please note that the sensor information described herein is only exemplary and not meant to be limiting.

At step 132, the vehicle control system 104 may determine a change in an operation mode and/or machine state of the vehicle based on the sensor information. As explained above, the vehicle control system 104 includes the estimation circuit 114 is configured to receive the vehicle information from the sensor circuit 112 and use that information to determine a change in the operation mode and/or machine state of the vehicle. For example, the estimation circuit 114 may receive sensor information about a storage tank associated with the agricultural vehicle. The estimation circuit 114 may use the sensor information to determine a change in the level of product within the storage tank as the agricultural vehicle continues to be in use. As another example, the estimation circuit 114 may receive sensor information from a hydraulic sensor assembly. Based on the sensor information from the hydraulic sensor assembly, the estimation circuit 114 may determine a change in the operation of an implement coupled to the agricultural vehicle.

At step 134, the vehicle control system 104 may determine one or more changes in the physical parameters of the agricultural vehicle 12 based on the change in the operation mode and/or machine state of the vehicle. Specifically, changes in machine states and/or operation mode leads to changes in critical machine parameters such as mass, moment of inertia, location of center of gravity, etc., of the agricultural vehicle which in turn changes the dynamic characteristics and handling of the vehicle. The vehicle control system 104 is configured to determine these changes in the physical parameters of the agricultural vehicle based on the changes to the operation mode and/or machine state of the vehicle.

At step 136, the vehicle control system 104 may update the auto-guidance controller to account for the one or more changes in the physical parameters of the agricultural vehicle 12. As mentioned above, the vehicle control system 104 includes the auto-guidance controller circuit 116 which is configured to continuously receive changes within the physical parameters as determined by the estimation circuit 114 and update the control of the vehicle based on the change in the physical parameters. In some embodiments, the auto-guidance controller circuit 116 updates the vehicle control system 104 using one or more correction offsets. Specifically, as the auto-guidance controller circuit 116 receives changes in the physical parameters of the vehicle, the auto-guidance controller circuit 116 generates one or more correction offsets based on these changes. In some embodiments, the correction offsets correct for changes in critical vehicle parameters (e.g., mass, moment of inertia, location of the center of gravity, etc.) which allows the auto-guidance controller circuit 116 to optimize the operation and performance of the agricultural vehicle 12 over a wide variety of operating conditions.

At step 138, the vehicle control system 104 may control the agricultural vehicle 12 based on the updated auto-guidance controller. In some embodiments, the vehicle control system 104 also control the operation of an implement attached to the agricultural vehicle 12. In some embodiments, the vehicle control system 104 controls the agricultural vehicle by controlling the positioning of the agricultural vehicle 12 and/or an implement attached to the vehicle. For example, if the auto-guidance controller is dynamically updated with a correction offset to account for a change in the center of gravity, the auto-guidance controller may control the steering of the vehicle based on this correction offset. The vehicle control system 104 may also control the operation of the vehicle 12 by controlling the braking of the vehicle, controlling the speed of the vehicle, and controlling the disbursement of the fluid through a sprayer.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 12 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. A method for controlling an agricultural vehicle comprising:
   receiving sensor information for the agricultural vehicle from one or more sensors;
   determining a first change in a position of an implement of the agricultural vehicle based on the sensor information, wherein the first change in the position of the implement causes a second change in a physical parameter of the agricultural vehicle;
   determining a third change in a dynamic handling of the agricultural vehicle based on the second change to the physical parameter of the agricultural vehicle caused by the first change in the position of the implement of the agricultural vehicle;
   generating a correction offset for an auto-guidance control system of the agricultural vehicle to offset the third change in the dynamic handling of the agricultural vehicle;
   updating an auto-guidance controller for the agricultural vehicle with the correction offset based on the second change in the physical parameter of the agricultural vehicle; and
   controlling an operation of the agricultural vehicle based on the updated auto-guidance controller.

2. The method of claim 1, wherein the physical parameter is at least one of a mass of the agricultural vehicle, a moment of inertia of the agricultural vehicle, and a location of a center of gravity on the agricultural vehicle.

3. The method of claim 1, wherein the agricultural vehicle includes a sprayer tank and is coupled to a sprayer implement.

4. The method of claim 1, wherein the one or more sensors includes at least one of volume sensor, a motion sensor, and a hydraulics sensor.

5. The method of claim 1, wherein the agricultural vehicle includes a product storage tank and is coupled to a combine implement which is configured to harvest product and store the product in the product storage tank.

6. The method of claim 1, wherein controlling the operation of the agricultural vehicle includes at least one of controlling a steering of the agricultural vehicle, controlling a speed of the agricultural vehicle, and controlling a braking mechanism of the agricultural vehicle.

7. The method of claim 1, wherein the method further comprises controlling an implement operation of the implement of the agricultural vehicle based on the updated auto-guidance controller.

8. A non-transitory computer-readable media comprising computer-readable instructions stored thereon that when executed by a processor causes the processor to:
   receive sensor information for an agricultural vehicle from one or more sensors;
   determine a first change in a position of an implement of the agricultural vehicle based on the sensor information, wherein the first change in the position of the implement causes a second change in a physical parameter of the agricultural vehicle;
   determine a third change in a dynamic handling of the agricultural vehicle based on the second change to the physical parameter of the agricultural vehicle caused by the first change in the position of the implement of the agricultural vehicle;
   generate a correction offset for an auto-guidance control system of the agricultural vehicle to offset the third change in the dynamic handling of the agricultural vehicle;
   update an auto-guidance controller for the agricultural vehicle with the correction offset based on the second change in the physical parameter of the agricultural vehicle; and
   control an operation of the agricultural vehicle based on the updated auto-guidance controller.

9. The non-transitory computer-readable media of claim 8, wherein the physical parameter is at least one of a mass of the agricultural vehicle, a moment of inertia of the agricultural vehicle, and a location of a center of gravity on the agricultural vehicle.

10. The non-transitory computer-readable media of claim 8, wherein the agricultural vehicle includes a sprayer tank and is coupled to a sprayer implement.

11. The non-transitory computer-readable media of claim 8, wherein the one or more sensors includes at least one of volume sensor, a motion sensor, and a hydraulics sensor.

12. The non-transitory computer-readable media of claim 8, wherein the agricultural vehicle includes a product storage tank and is coupled to a combine implement which is configured harvest product and store a product in the product storage tank.

13. The non-transitory computer-readable media of claim 8, wherein controlling the operation of the agricultural vehicle includes at least one of controlling a steering of the agricultural vehicle, controlling a speed of the agricultural vehicle, and controlling a braking mechanism of the agricultural vehicle.

14. The non-transitory computer-readable media of claim 8, wherein the processor further executes the computer-readable instructions to control an implement operation of the implement of the agricultural vehicle based on the updated auto-guidance controller.

15. An auto-guidance vehicle control system comprising:
   an agricultural vehicle;
   an implement coupled to the agricultural vehicle; and
   a vehicle control system comprising one or more processing circuits, each processing circuit including a processor and a memory, the memory having instructions stored thereon that, when executed by the processor, cause the one or more processing circuits to:
      receive sensor information for the agricultural vehicle from one or more sensors;

determine a first change in a position of the implement of the agricultural vehicle based on the sensor information, wherein the first change in the position of the implement causes a second change in a physical parameter of the agricultural vehicle;

determine a third change in a dynamic handling of the agricultural vehicle based on the second change to the physical parameter of the agricultural vehicle caused by the first change in the position of the implement of the agricultural vehicle;

generating a correction offset for an auto-guidance control system of the agricultural vehicle to offset the third change in the dynamic handling of the agricultural vehicle;

update an auto-guidance controller for the agricultural vehicle with the correction offset based on the second change in the physical parameter of the agricultural vehicle; and control an operation of the agricultural vehicle based on the updated auto-guidance controller.

16. The auto-guidance vehicle control system of claim 15, wherein the implement is at least one of a sprayer implement and a combine implement.

* * * * *